United States Patent
Saitou

(10) Patent No.: US 7,369,338 B2
(45) Date of Patent: May 6, 2008

(54) SERVO WRITER, AND WRITE AND INSPECTION METHOD OF SERVO SIGNAL

(75) Inventor: Tetsuya Saitou, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 54 days.

(21) Appl. No.: 11/187,950

(22) Filed: Jul. 25, 2005

(65) Prior Publication Data

US 2006/0056095 A1    Mar. 16, 2006

(30) Foreign Application Priority Data

Sep. 10, 2004    (JP) ............... 2004-263243

(51) Int. Cl.
G11B 27/36 (2006.01)
G11B 21/02 (2006.01)

(52) U.S. Cl. .......................... 360/31; 360/75

(58) Field of Classification Search .............. None
See application file for complete search history.

(56) References Cited

U.S. PATENT DOCUMENTS 6,873,587 B2 *  3/2005  Hashimoto ............... 360/75

2005/0219756 A1 * 10/2005  Dugas et al. ............... 360/241

FOREIGN PATENT DOCUMENTS

| JP | 2001-210034 A | 8/2001 |
|---|---|---|
| JP | 2003-141836 A | 5/2003 |
| JP | 2003-323704 A | 11/2003 |
| JP | 2004-022001 A | 1/2004 |
| JP | 2004-219298 A | 8/2004 |

* cited by examiner

Primary Examiner—Andrea Wellington
Assistant Examiner—Dan I Davidson
(74) Attorney, Agent, or Firm—Sughrue Mion, PLLC

(57) ABSTRACT

A servo writer of the invention writes a servo signal in a magnetic tape, reads and inspects the signal, and has a servo writer main body and a plurality of unit panels changeably loaded to a panel change unit provided at the main body according to a product class of the tape, wherein any of the unit panels has a servo write head for writing the signal in the tape and a write-sub-control mechanism for controlling a writing of the signal by the write head, wherein the write head and the sub-control mechanism write a predetermined signal in the tape, and wherein the main body has a signal main control mechanism for mainly controlling a writing of the signal in the tape by the write head, a servo read head for reading the signal written in the tape, and a signal inspection mechanism for processing and inspecting the signal.

12 Claims, 6 Drawing Sheets

SERVO WRITER, AND WRITE AND INSPECTION METHOD OF SERVO SIGNAL

BACKGROUND OF THE INVENTION

1. Field of the Invention

The present invention relates to a servo writer for writing a servo signal in a magnetic tape, and a write and inspection method of the servo signal.

2. Description of the Related Art

Conventionally, a magnetic tape is widely used as a recording medium for recording/reproducing data. In the magnetic tape are formed many data tracks for recording data in lateral directions of the magnetic tape in order to heighten a recording density per unit area. In the magnetic tape, because minute movements in the lateral directions are repeated in running due to various reasons, it becomes difficult for a recording/reproducing head to completely trace the data tracks in recording/reproducing data. Consequently, in recording/reproducing data an apparatus for recording/reproducing this kind of magnetic tape makes it a reference a servo signal written in the magnetic tape in advance, and dynamically controls a tracking of the recording/reproducing head for the magnetic tape. In other words, the apparatus reads a servo signal by a servo read head integrally formed with the recording/reproducing head, detects a displacement of a position of the recording/reproducing head in the lateral directions of the magnetic tape, and moves the recording/reproducing head or controls a running state of the magnetic tape so as to modify the displacement. The servo signal is written along a running direction in advance by a dedicated servo writer (see paragraphs 0002 to 0005 of JP 2003-141836A).

Because the servo signal is written in a magnetic tape with a different pattern according to a product class of the magnetic tape, a servo writer for writing the servo signal is specialized, matching each of the product class. Therefore, in order to divert a servo writer used for writing the servo signal in one product class of a magnetic tape to a writing of a servo signal in another product class of a magnetic tape, it becomes necessary to revamp the servo writer and to change a control circuit in order to change a standard for inspecting and evaluating a servo signal to be written and a servo signal written. In other words, in order to write a servo signal corresponding to a magnetic tape different in a product class are needed a work for refixing a servo write head or its circuit and a reproducing head or its circuit, and a change of conditions thereof. Therefore, it is necessary to stop the servo writer for a long time, and there is a problem in productivity and cost of the magnetic tape. On the other hand, in order to avoid the problem due to such the work of refixing the servo write head, although servo writers corresponding to each product classes are respectively prepared as many as a number of the product classes, there is a problem in equipment cost and magnetic tape cost.

But these years it is requested to produce a wide variety of products timely by a proper amount because of a format diversification of a magnetic tape market. In order to efficiently produce such different product classes of magnetic tapes, it is also requested that a servo writer for writing a servo signal in the magnetic tapes can flexibly handle a change of a product class, switch such a servo write head, write a proper servo signal in every magnetic tape, and inspect the servo signal written.

Consequently, it is strongly requested a servo writer that can write a proper servo signal for each magnetic tape different in a product class thereof, and inspect the servo signal written; and a write and inspection method of the servo signal using the servo writer.

SUMMARY OF THE INVENTION

A servo writer of a first aspect of the present invention writes a servo signal in a magnetic tape, reads and inspects the servo signal written, and comprises a servo writer main body and a plurality of unit panels changeably loaded to a panel change unit provided at the servo writer main body according to a product class of the magnetic tape where the servo signal is to be written, wherein each of the plurality of the unit panels comprises a servo write head for writing the servo signal in the magnetic tape and a write-sub-control mechanism for controlling a writing of the servo signal by the servo write head, wherein the servo write head and the write-sub-control mechanism are configured so as to be able to write a predetermined signal in the magnetic tape according to the product class of the magnetic tape, and wherein the servo writer main body comprises a servo signal main control mechanism for mainly controlling a writing of the servo signal in the magnetic tape by the servo write head, a servo read head for reading the servo signal written in the magnetic tape, and a servo signal inspection mechanism for processing and inspecting the servo signal read.

In accordance with the servo writer it is enabled to write each proper servo signal according to a magnetic tape different in a product class thereof, and to inspect the written servo signal by changing a unit panel comprising a servo write head and a write-sub-control mechanism for controlling a writing of the servo signal by the servo write head.

In addition, a servo writer of a second aspect of the present invention writes a servo signal in a magnetic tape, reads and inspects the servo signal written, and comprises a servo writer main body, a panel change unit provided at the servo writer main body, and a plurality of unit panels changeably loaded according to a product class of the magnetic tape where the servo signal is to be written, wherein each of the plurality of the unit panels comprises a servo write head for writing the servo signal in the magnetic tape, a servo read head for reading the servo signal written in the magnetic tape, a write sub-control mechanism for controlling a writing of the servo signal by the servo write head, and an amplification mechanism for amplifying the servo signal read by the servo read head, wherein the servo write head, the servo read head, the write sub-control mechanism, and the amplification mechanism are configured so as to be able to write and read a predetermined signal in the magnetic tape according to the product class of the magnetic tape, and wherein the servo writer main body comprises a servo signal main control mechanism for mainly controlling a writing of the servo signal in the magnetic tape by the servo write head and a servo signal inspection mechanism for processing and inspecting the amplified servo signal transmitted from the amplification mechanism.

In accordance with the servo writer it is enabled to write each proper servo signal according to a magnetic tape different in a product class thereof, and to inspect the servo signal written by changing a unit panel comprising a servo write head, a servo read head, a write-sub-control mechanism, and an amplification mechanism at the panel change unit provided in the servo writer main body.

Furthermore, a servo writer of a third aspect of the present invention writes a servo signal in a magnetic tape, reads and inspects the servo signal written, and comprises a servo writer main body, and a plurality of first unit panels and a plurality of second unit panels changeably loaded at a panel change unit provided at the servo writer main body according to a product class of the magnetic tape where the servo signal is to be written, wherein each of the plurality of the first unit panels comprises a servo write head for writing the servo signal in the magnetic tape, and a write sub-control mechanism for controlling a writing of the servo signal by the servo write head, wherein the servo write head and the write sub-control mechanism are configured so as to be able to write and read a predetermined signal in the magnetic tape according to the product class of the magnetic tape, wherein any of the second unit panels comprises a servo read head for reading the servo signal written in the magnetic tape and an amplification mechanism for amplifying the servo signal read by the servo read head, wherein the servo read head and the amplification mechanism are configured so as to be able to read the servo signal written in the magnetic tape according to the product class of the magnetic tape, and wherein the servo writer main body comprises a servo signal main control mechanism for mainly controlling a writing of the servo signal in the magnetic tape by the servo write head and a servo signal inspection mechanism for processing and inspecting the amplified servo signal transmitted from the amplification mechanism.

In accordance with the servo writer it is enabled to write each proper servo signal according to a magnetic tape different in a product class thereof, and to inspect the servo signal written by independently changing any of a first unit panel and a second unit panel at the panel change unit provided in the servo writer main body according to the product class of the magnetic tape, wherein the first unit panel comprises a servo write head and a write-sub-control mechanism, and the second unit panel comprises a servo read head and an amplification mechanism.

Still furthermore, the present invention provides a method of writing and inspecting a servo signal by changing any of the unit panels, or the first unit panel and/or the second unit panel so as to be able to identify a product class of a magnetic tape and to write a predetermined servo signal in the magnetic tape.

In accordance with the method of writing and inspecting a servo signal it is enabled to handle a different product class of a magnetic tape in a short period of time by identifying the product class of the magnetic tape and changing the unit panels, or the first unit panel and/or the second unit panel according to the servo signal to be written in the magnetic tape.

DESCRIPTION OF THE PREFERRED EMBODIMENTS

Here will be described embodiments of the present invention in detail, referring to drawings as needed.

Figure 1:
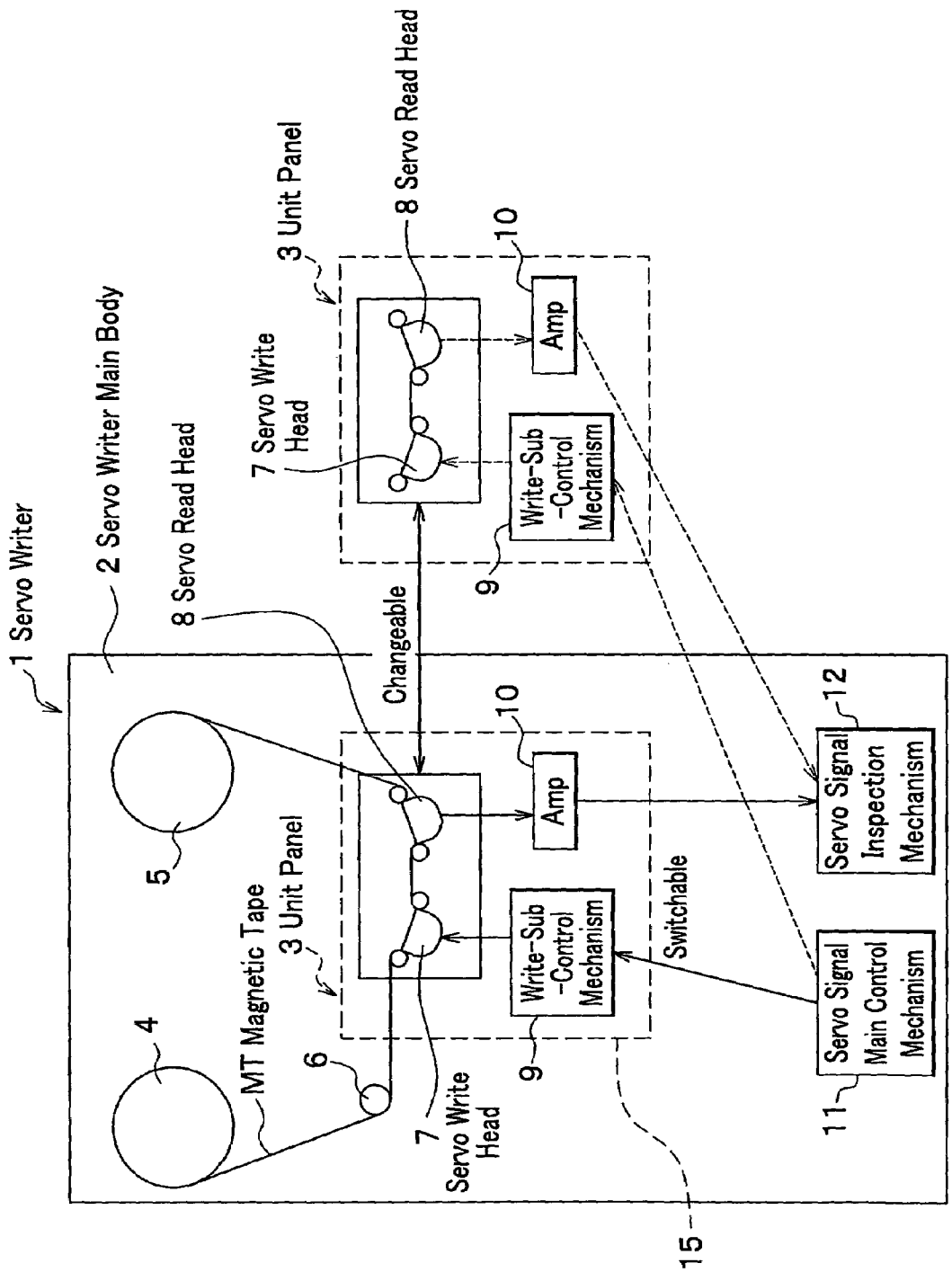
FIG. 1 is a drawing showing an outline of a servo writer related to a first embodiment of the present invention.

A servo writer 1 shown in FIG. 1 comprises a servo writer main body 2, and a plurality of unit panels 3 that are changeably loaded to the servo writer main body 2, and any of which comprises a servo write head 7, a servo read head 8, a write-sub-control mechanism 9, and an amp (amplification mechanism) 10. Meanwhile, although in FIG. 1 two unit panels 3 are concretely shown, it is assumed that unit panels 3 of an appropriate number are prepared as described later according to a product class number of magnetic tapes where the servo writer 1 schedules to write a servo signal.

The servo writer main body 2 comprises a supply reel 4 for sending out a magnetic tape MT, a take-up reel 5 for winding the magnetic tape MT sent out from the supply reel 4, and a guide roller 6 for guiding a running direction of the magnetic tape MT sent out from the supply reel 4. In addition, the servo writer main body 2 comprises various apparatuses such as a power unit (not shown), a tension regulator (not shown) for regulating a tension of the magnetic tape MT to a predetermined tension, a tension detector, a speed regulator, and a speed detector.

On the supply reel 4 the magnetic tape MT slit into a product width from a wide web raw material is set in a pancake of a large diameter winding before a servo pattern is written thereon. The take-up reel 5 is configured so as to wind the magnetic tape MT sent out from the supply reel 4.

In addition, the servo writer main body 2 comprises a servo signal main control mechanism 11 and a servo signal inspection mechanism 12.

The servo signal main control mechanism 11 mainly controls a writing of a servo signal into the magnetic tape MT by the servo write head 7. The servo signal main control mechanism 11 is connected to the write-sub-control mechanism 9, and controls a generation of a servo pattern by the write-sub-control mechanism 9 and the writing of the servo signal into the magnetic tape MT by the servo write head 7. For example, the servo signal main control mechanism 11 transmits data relating to unique digital information (a production date, a serial number, and the like) of every magnetic tape to be written in the magnetic tape MT to the write-sub-control mechanism 9. The write-sub-control mechanism 9 generates a servo signal to be written in the magnetic tape MT, based on the data, and controls the writing of the servo signal into the magnetic tape MT by the servo write head 7.

The servo signal inspection mechanism 12 is connected to the amp (amplification mechanism) 10 provided at the unit panel 3, receives a servo signal read from the magnetic tape MT by the servo read head 8 and amplified by the amp (amplification mechanism) 10, and processes and inspects the servo signal amplified. The servo signal inspection mechanism 12 is configured, for example, of a general computer, which can perform a comparison, an operation, a storage, and the like, and dedicated circuitry; compares a pattern of a servo signal memorized in advance with that of a servo signal actually read by the servo read head 8 and transmitted from the amp 10; and evaluates a quality of the servo signal. To be more precise, in a case of the magnetic tape MT where a Timing Based Servo (hereinafter referred to as TBS) signal is written, the quality of a servo signal written in the magnetic tape MT is evaluated by determining whether or not such a intensity of each pulse peak generated from the servo signal, which is reproduced by the servo read head 8 and is arrayed in a plurality of pairs like a bottom-open-reverse V-letter, and a time interval between each pulse peak conform to a predetermined inspection standard.

Next, the unit panel 3 comprises the servo write head 7 for writing a servo signal in the magnetic tape MT, the write-sub-control mechanism 9 for controlling a writing of the servo signal into the magnetic tape by the servo write head 7, the servo read head 8 for reading the servo signal written in the magnetic tape MT, and the amp (amplification mechanism) 10 for amplifying the servo signal read by the servo read head 8.

Figure 2:
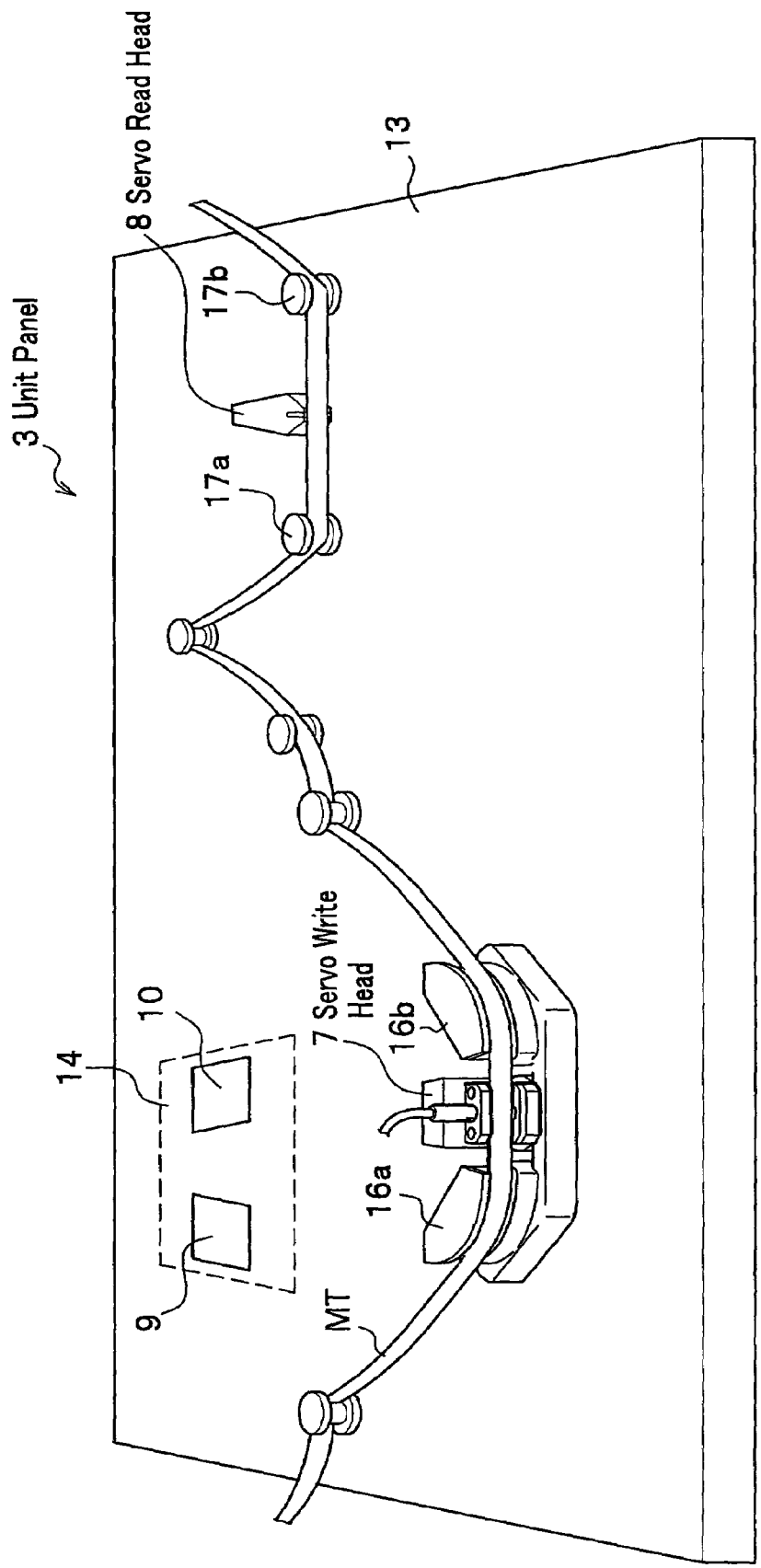
FIG. 2 is a general perspective view showing a configuration of a unit panel.

The unit panel 3 is designed, for example as shown in FIG. 2, so that: on a surface of a panel board 13 are provided the servo write head 7 arranged at an upstream side along a running direction of the magnetic tape MT, and the servo read head 8 arranged at a downstream side thereof; and a control circuit unit 14 (shown with a broken line in FIG. 2) configured of the write-sub-control mechanism 9 and the amp 10 is attached on an obverse or reverse of the panel board 13. The unit panel 3 is changeable loaded to a panel change unit 15 provided in the servo writer main body 2.

In the servo write head 7 is formed a write gap on a slide face 7*a* (see FIG. 3) with the magnetic tape MT. A planar form of the write gap is designed, for example, like a bottom-open-reverse V-letter in a case of writing the TBS signal. In addition, in the servo write head 7 are formed a plurality of write gaps so as to range at a same distance in lateral directions of the magnetic tape MT. Each of the write gaps is designed to generate a leak magnetic flux leaking toward the magnetic tape MT from the slide face 7*a* by a pulse current being given, wherein the pulse current is loaded on a coil (not shown) of the servo write head 7 from the write-sub-control mechanism 9. In other words, the write gap is designed to continuously record a plurality of servo bands parallel each other where servo patterns like a bottom-open-reverse V-letter continue along a running direction D (a longitudinal direction of the magnetic tape MT) of the magnetic tape MT by the leak magnetic flux intermittently generated with the pulse current supplied.

Figure 3:
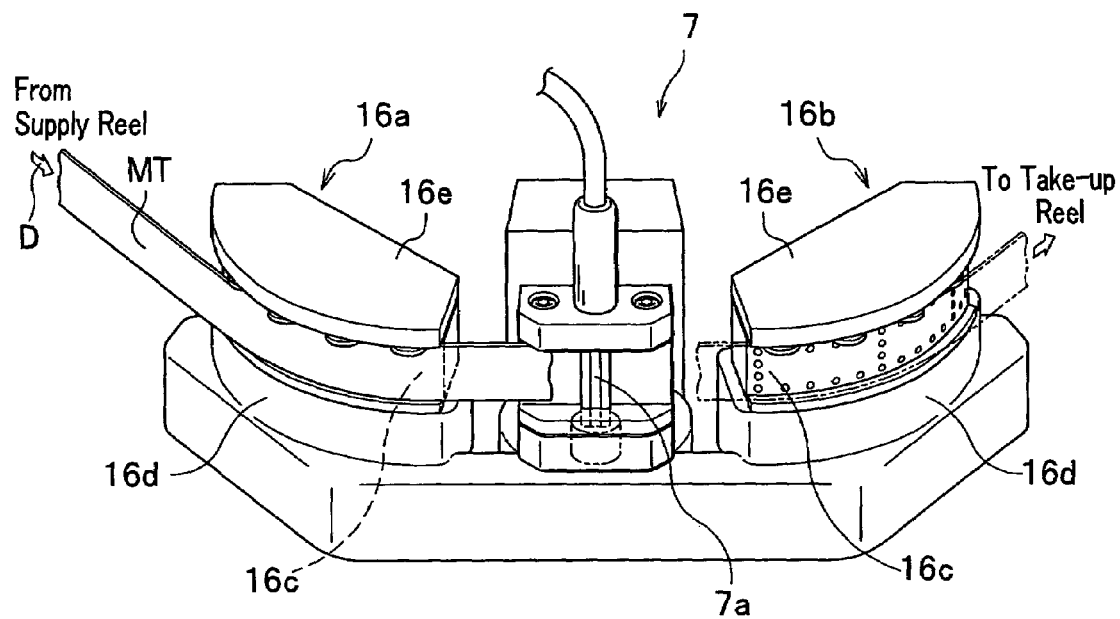
FIG. 3 is an enlarged perspective view of a servo write head related to the first embodiment.

In addition, in the servo write head 7, as shown in FIGS. 2 and 3, at the upstream side and down stream side thereof along the running direction D of the magnetic tape MT are arranged tape guides 16*a*, 16*b* for regulating a position in the lateral directions of the magnetic tape MT contacting the servo write head 7. Contact faces 16*c* of the tape guides 16*a*, 16*b* for the magnetic tape MT are designed like an arc so as to smoothly contact a recording face of the magnetic tape MT; and at edges of a panel side and a human side are formed flanges 16*d* and flanges 16*e* along the running direction D of the magnetic tape MT. The position in the lateral directions of the magnetic tape MT is extremely accurately regulated, and a servo signal is written at a predetermined position by the servo write head 7.

The servo read head 8 reads a servo signal written in the magnetic tape MT by the servo write head 7, and the servo signal read is transmitted to the amp 10 of the control circuit unit 14. The servo read head 8 may appropriately comprise tape guides same as the servo write head 7. The servo read head 8 is configured so as to accurately read a servo signal according to the servo signal written in the magnetic tape MT by the servo write head 7, corresponding to a product class thereof. For example, the servo read head 8 comprises a gap form formed corresponding to a servo pattern of servo signals written in the magnetic tape MT by the servo write head 7, a number of tracks, a distance of servo bands, and the like. The configuration of the servo read head 8 is appropriately decided according to such a product class and inspection standard of the magnetic tape MT of which servo signals the unit panel 3 writes and inspects.

Figure 4:
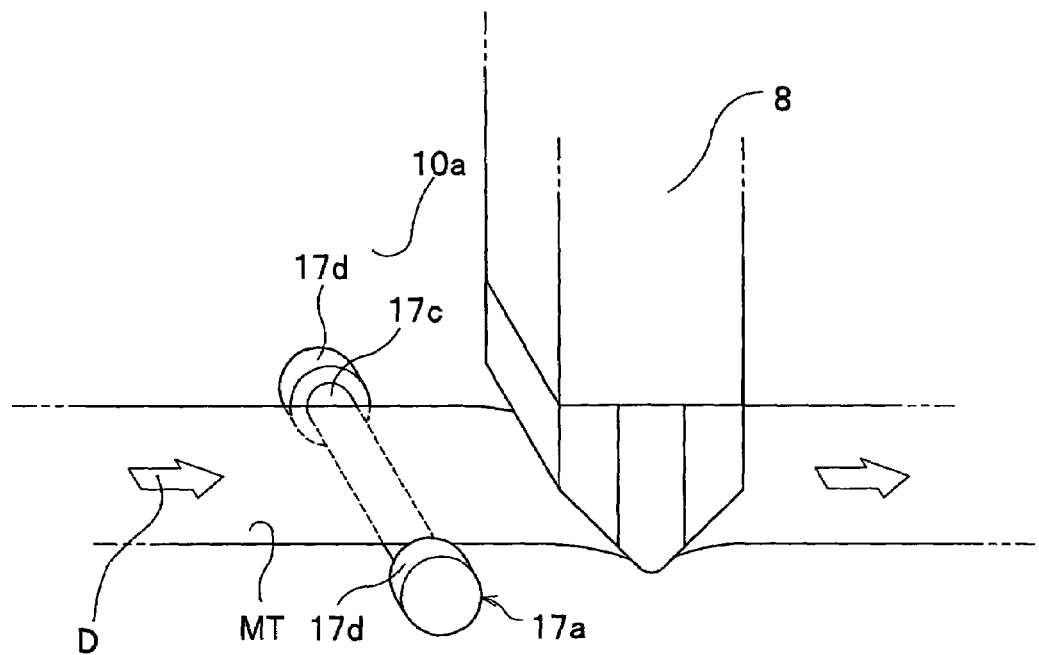
FIG. 4 is an enlarged perspective view of a servo read head related to the first embodiment.

In the servo read head 8, as shown in FIG. 2, at an upstream side and downstream side thereof are arranged guides 17*a*, 17*b* for running the magnetic tape MT along the servo read head 8. The guides 17*a*, 17*b* regulate the magnetic tape MT in the lateral directions thereof and make it contact the servo read head 8. The guides 17*a*, 17*b* comprise, as shown in FIG. 4, flanges 17*d*, 17*d* like a collar larger than a columnar guide portion 17*c* at the both ends thereof, and are fixed at the unit panel 3.

The write-sub-control mechanism 9 (see FIGS. 1 and 2) provided at the control circuit unit 14 is configured so as to be connectable to the servo signal main control mechanism 11 provided at the servo writer main body 2, and is connected to the servo signal main control mechanism 11 when the unit panel 3 is loaded to the panel change unit 15 of the servo writer main body 2. When the write-sub-control mechanism 9 receives a control signal from the servo signal main control mechanism 11, it transmits a servo signal current pulse to be written in the magnetic tape MT to the servo write head 7. The write-sub-control mechanism 9 supplies the servo signal current pulse of a predetermined servo pattern to the servo write head 7 according to the product class of the magnetic tape MT where a servo signal is to be written, and writes the servo signal in a servo band of the magnetic tape MT by the servo write head 7. For example, in a case of writing the TBS signal in the magnetic tape MT, the write-sub-control mechanism 9 generates a predetermined servo signal current pulse, based on a reference clock, and transmits it to the servo write head 7.

In addition, the amp 10 amplifies a servo signal read from the magnetic tape MT by the servo read head 8, and transmits the servo signal amplified to the servo signal inspection mechanism 12 provided at the servo writer main body 2. The amp 10 is configured so as to be able to amplify the servo signal to a predetermined signal intensity corresponding to a servo signal written in the magnetic tape MT according to the product class of the magnetic tape MT by the servo write head 7 of the unit panel 3. For example, it is preferable that the amp 10 comprises a gain of 60 dB, a low pass filter of several MHz as a frequency characteristic, and a capacity of not less than 20 dB in S/N.

The control circuit unit 14 configured of the write-sub-control mechanism 9 and the amp 10 is designed, in loading the unit panel 3 to the servo writer main body 2, to be connected to a connection portion (not shown) provided at the servo writer main body 2, and so that the write-sub-control mechanism 9 and the amp 10 are connected to the servo signal main control mechanism 11 and the servo signal inspection mechanism 12, respectively.

The unit panel 3 is changeably loaded to the panel change unit 15 (see FIG. 1) of the servo writer main body 2. The panel change unit 15 of the unit panel 3 is not specifically limited, and for example, a structure shown in FIG. 5 can be adopted. In the panel change unit 15 shown in FIG. 5 it is enabled to attach the unit panel 3 at a predetermined position with a predetermined torque by pressing position adjustment screws 18 fitted in three positions of the panel board 13 of the unit panel 3 to fit-in platforms 19 provided at the servo writer main body 2, corresponding to the position adjustment screws 18. On the fit-in platforms 19 are respectively provided pressing units 20 for pressing the panel board 13 toward the servo writer main body 2, abutting with an upper face of the panel board 13. By adopting the structure shown in FIG. 5, it is enabled in changing the unit panel 3 to attach the unit panel 3 at a same position with repeatability every time by abutting the position adjustment screws 18 of the unit panel 3 with the fit-in platforms 19 and pressing the pressing units 20 with a predetermined torque. In addition, a detachment/attachment of the unit panel 3 can be performed only by loosening the pressing units 20, and in again attaching the panel 3, a height thereof can be repeated without adjusting the positions of the position adjustment screws 18.

Figure 5:
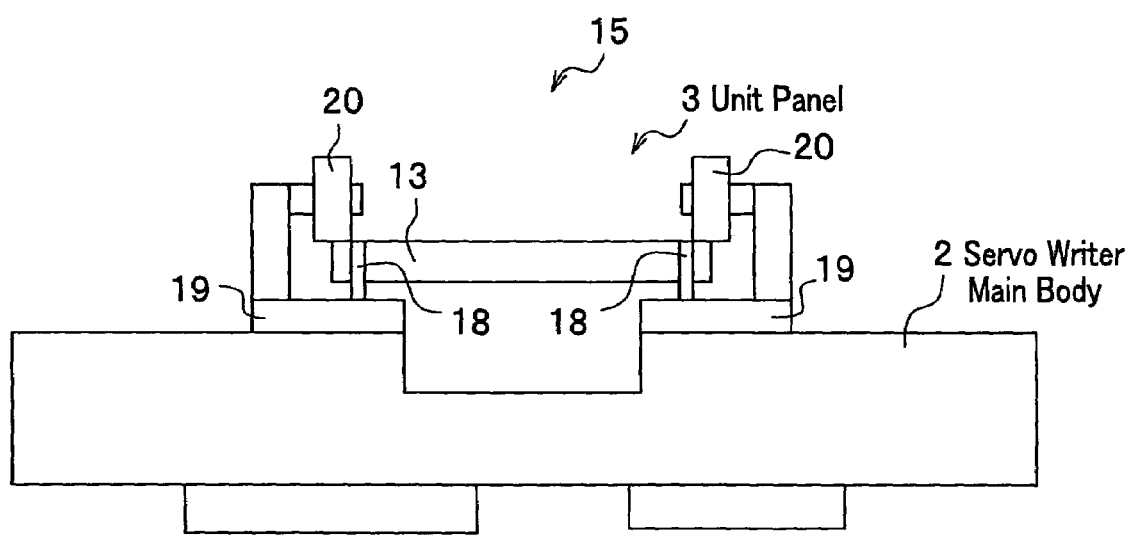
FIG. 5 is a drawing showing an attachment structure of the unit panel in the servo writer related to the first embodiment.

Accordingly, if a plurality of the unit panels 3 where the servo write head 7, the servo read head 8, the write-sub-control mechanism 9, and the amp 10 are properly arranged on the panel board 13 are prepared according to the product class of the magnetic tape MT where the servo writer 1 schedules to write a servo signal, it is enabled to load any of the unit panels 3, which is conformed to the product class of the magnetic tape MT, to the panel change unit 15 of the servo writer main body 2 according to the product class to be produced and to make ready for a production of the magnetic tape MT. At this time, as shown in FIG. 5, it is enabled to swiftly change the unit panel 3 by loading the unit panel 3 with the position adjustment screws 18 to the fit-in platforms 19 provided at the panel change unit 15 of the servo writer main body 2; and by fixing the panel board 13 with the pressing units 20. Here, it is preferable that the unit panel 3 comprises an identifier indicating information (for example, information such as traceability, and concavity/convexity, color, or mass weight of the panel 3, or a head resistance value) with respect to the product class of the magnetic tape MT and the servo signal to be written therein. It is effective to comprise the identifier because the product class of the magnetic tape MT corresponding to the unit panel 3 is clearly identified, the panel 3 is properly and swiftly changed, a proper servo signal is written according to the product class of the tape MT, and the servo signal written can be inspected.

On the other hand, it is also enabled to provide a switch mechanism in the servo writer main body 2, and to switch a write/inspection pattern by the switch mechanism, to write a predetermined servo signal in the magnetic tape MT, and to read and inspect the servo signal written according to the product class of the magnetic tape MT.

The servo writer 1 loads a predetermined unit panel 3 to the panel change unit 15 according to the product class of the magnetic tape MT where a servo signal is to be written. In other words, the servo writer 1 selects the unit panel 3 comprising the servo write head 7 and the write-sub-control mechanism 9 provided according to such a servo pattern to be written in the magnetic tape MT, and the servo read head 8 and the amp 10 provided according to an inspection standard of a servo signal to be written; and loads the unit panel 3 to the panel change unit 15. At this time the product class of the magnetic tape MT corresponding to each unit panel 3 can be identified by an identifier added to the unit panel 3. Then, the write-sub-control mechanism 9 and the amp 10 are connected to the servo signal main control mechanism 11 and the servo signal inspection mechanism 12, respectively.

Next, in the servo writer 1 the magnetic tape MT pulled out of the supply reel 4 is hung across the guide roller 6, the tape guide 16a, the servo write head 7, the tape guide 16b, the guide 17a, the servo read head 8, the guide 17b, and other guide rollers; and an end of the tape MT pulled out is attached to a core of the take-up reel 5. Then, when the take-up reel 5 is rotated by a drive apparatus (not shown), the magnetic tape MT is sent out from the supply reel 4 to the take-up reel 5. Then, while the magnetic tape MT is regulated by the tape guides 16a, 16b in the lateral directions thereof, it contacts the slide face 7a of the servo write head 7, and writes a predetermined servo signal in a servo track on a magnetic face of the magnetic tape MT by a servo signal current pulse input from the write-sub-control mechanism 9. While the magnetic tape MT where the servo signal has been written is regulated by the guides 17a, 17b in the lateral directions thereof, it contacts the servo read head 8 and thereby the servo signal written is read. The servo signal read by the servo read head 8 is amplified by the amp 10 and is input to the servo signal inspection mechanism 12 of the servo writer main body 2. The servo signal inspection mechanism 12 processes and inspects the servo signal amplified.

Thus comparing patterns of servo signals, the servo writer 1 evaluates a quality of the servo signals written.

Furthermore, in order to switch over to a production of a different product class of the magnetic tape MT, according to that of a new magnetic tape MT, the servo writer 1 swiftly selects the unit panel 3 comprising the servo write head 7 and the write-sub-control mechanism 9 provided according to such a servo pattern to be written in the magnetic tape MT, and the servo read head 8 and the amp 10 provided according to an inspection standard of a servo signal to be written; and loads the panel 3 to the panel change unit 15, and copes with a production of the new magnetic tape MT. At this time parameters such as a tension and speed of a running system are also changed according to the product class of the magnetic tape MT.

Figure 6:
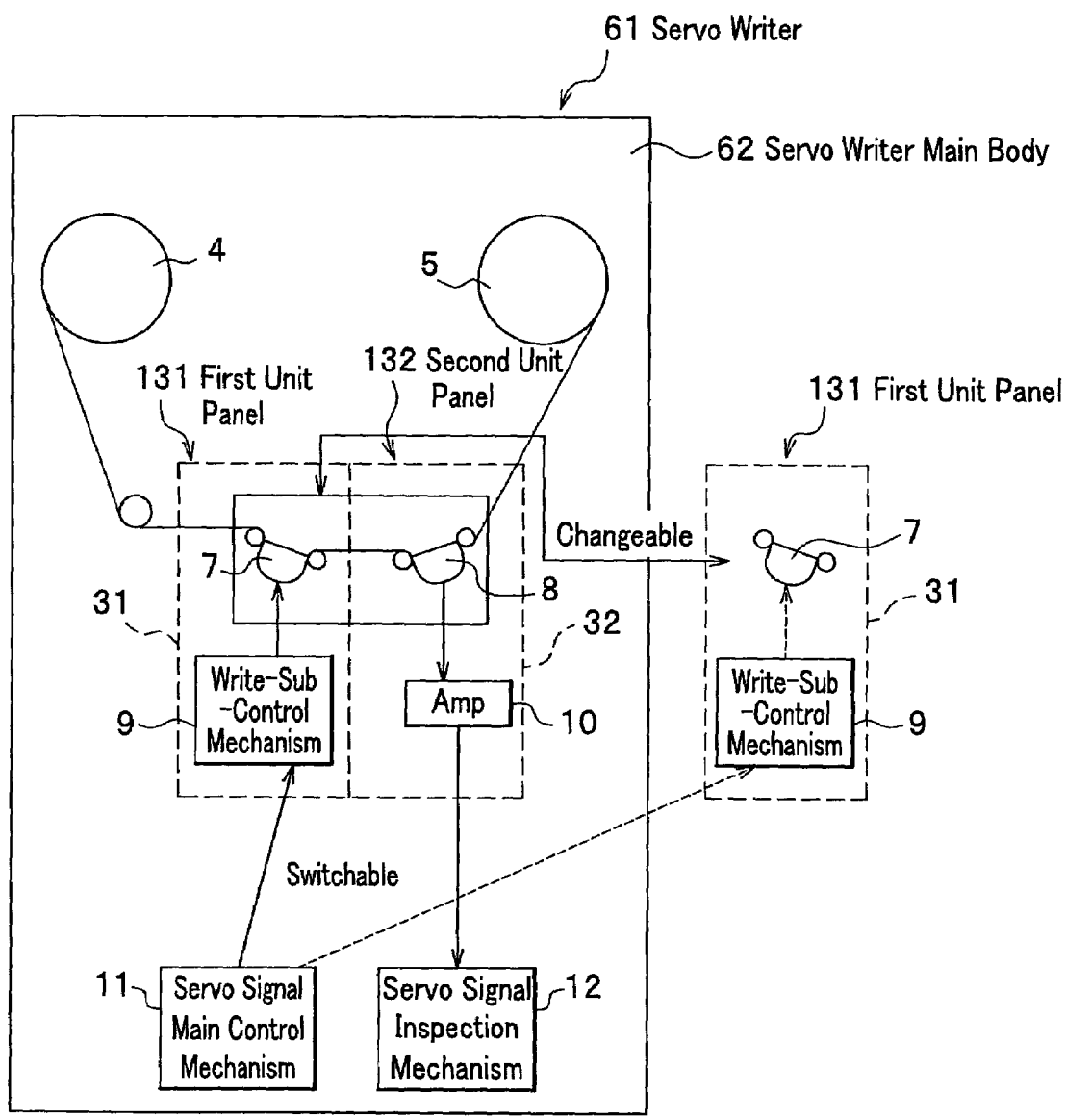
FIG. 6 is a drawing showing an outline of a servo writer related to a second embodiment of the present invention.

Next, FIG. 6 is a general plan view showing a servo writer 61 related to a second embodiment of the present invention.

The servo writer 61 comprises a same configuration as the unit panel 3 of the first embodiment except that the unit panel 3 in the servo writer 1 of the first embodiment is arranged at each independent panel board, that is, a first unit panel 131 comprising the servo write head 7 and the write-sub-control mechanism 9 and a second unit panel 132 comprising the servo read head 8 and the amp 10. Accordingly, a duplicated description is omitted.

In the servo writer 61 the servo write head 7 and the servo read head 8 are arranged at different panel boards 31, 32, respectively, and the servo writer 61 independently comprises the first unit panel 131 and the second unit panel 132. Accordingly, if preparing a proper number of the first unit panel 131 and the second unit panel 132 according to a product class number of the magnetic tape MT, where a servo signal is to be written by the servo writer 61 loaded, or variations of servo signals, changing the first unit panel 131 and the second unit panel 132, and loading them to a servo writer main body 62, it is enabled to swiftly handle a wide variety of servo patterns and inspection standards of magnetic tapes.

In addition, in the servo writer 61 the first unit panel 131 comprises the tape guides 16a, 16b and the second unit panel 132 comprises the guides 17a, 17b.

Also in the second embodiment, only by changing the first unit panel 131 and the second unit panel 132, it is enabled to easily change a servo signal to be written in the magnetic tape MT and a pattern to be inspected, to write a proper servo signal according to a different product class of the magnetic tape MT, and to inspect and evaluate the servo signal written. At this time it is also enabled to change only the first unit panel 131, and to change only the second unit panel 132. Accordingly, if only the first unit panel 131 is changed out of the existing first unit panel 131 and the second unit panel 132, and the servo write head 7 and the write-sub-control mechanism 9 are changed, it is effective in a case of being able to handle the product class of the magnetic tape MT where a servo signal is scheduled to be written next, because only a work of changing the first unit panel 131 is sufficient. In addition, it is convenient in a case of changing only the servo read head 8. Furthermore, it is enabled to flexibly handle a servo signal pattern, an inspection pattern, and the like conformed to the product class of the magnetic tape MT by combining the first unit panel 131 and the second unit panel 132.

Figure 7:
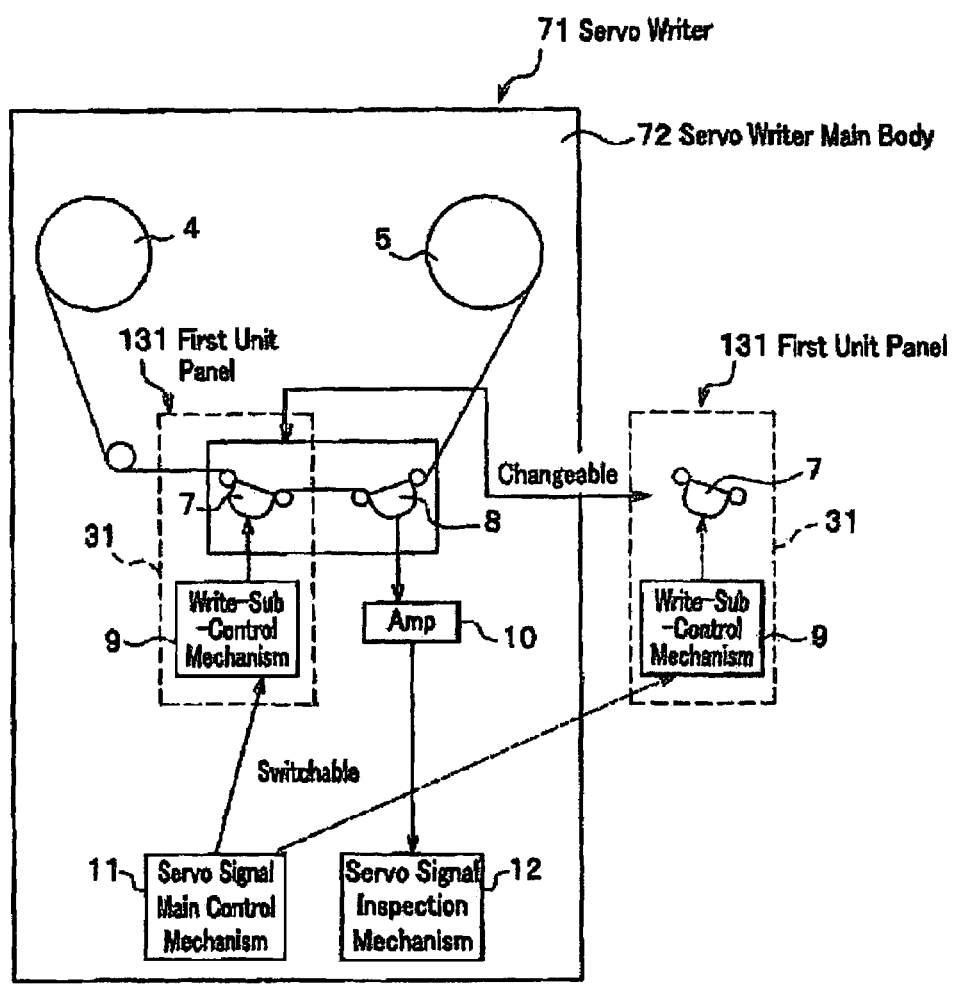
FIG. 7 is a drawing showing a servo writer according to another embodiment of the present invention.

Thus, although the embodiments of the present invention are described, the invention is not limited thereto and various variations are available without departing from the spirit and scope of the invention. For example, the servo write head 7 is not limited to one with respect to any of the unit panel 3 and the first unit panel 131, and can be arranged a plurally. Similarly, the servo read head for reading the servo signal written in said magnetic tape may be located on the servo writer main body, rather than on a separate panel. Such a configuration is shown in FIG. 7. In addition, it is not necessary to arrange the write-sub-control mechanism 9 and the amp 10 at any of the unit panel 3 and first unit panel 131 where the servo write head 7 and the write-sub-control mechanism 9 are arranged or at the second unit panel 132; the write-sub-control mechanism 9 and the amp 10 can also be configured as another unit.

What is claimed is:

1. A servo writer for writing a servo signal in a magnetic tape, and reading and inspecting the servo signal written, the writer comprising:
    a servo writer main body; and
    a plurality of unit panels changeably loaded to a panel change unit provided at said servo writer main body according to a product class of the magnetic tape where said servo signal is to be written,
    wherein each of said plurality of the unit panels comprises a servo write head for writing the servo signal in said magnetic tape and a write-sub-control mechanism for controlling a writing of the servo signal by said servo write head, wherein said servo write head and said write-sub-control mechanism are configured so as to be able to write a predetermined signal in said magnetic tape according to the product class of said magnetic tape, and
    wherein said servo writer main body comprises a servo signal main control mechanism for mainly controlling a writing of the servo signal in said magnetic tape by the servo write head of the unit panel selected in the panel change unit, a servo read head for reading the servo signal written in said magnetic tape, and a servo signal inspection mechanism for processing and inspecting the servo signal read.

2. A servo writer according to claim 1, wherein any of said unit panels comprises a tape guide for regulating a position in lateral directions of a running magnetic tape, contacting said servo write head.

3. A servo writer according to claim 2 that can write a predetermined servo signal according to a product class of said magnetic tape, and read and inspect the written servo signal by an identifier provided at any of said unit panels and/or a switch mechanism provided at said servo writer main body.

4. A servo writer according to claim 1 that can write a predetermined servo signal according to a product class of said magnetic tape, and read and inspect the written servo signal by an identifier provided at any of said unit panels and/or a switch mechanism provided at said servo writer main body.

5. A servo writer according to claim 1, wherein the servo signal main control mechanism sends information of every magnetic tape to the write-sub-control mechanism.

6. A servo writer according to claim 5, wherein the write-sub-control mechanism generates the predetermined servo signal to be written in the magnetic tape based on the information sent by the servo-signal-main control mechanism.

7. The servo writer according to claim 1, wherein the servo signal main control mechanism controls the write-sub-control mechanism.

8. The servo writer according to claim 1, wherein the servo signal main control mechanism controls the generation of a servo pattern by the write-sub-control mechanism.

9. The servo writer according to claim 1, wherein the servo signal main control mechanism sends a control signal to the write-sub-control mechanism that is independent of the product class of the magnetic tape.

10. A write and inspection method of a servo signal that uses a servo writer according to claim 1 and changes any of said unit panels according to a product class of a magnetic tape and to write a predetermined servo signal in the magnetic tape.

11. A write and inspection method of a servo signal that uses a servo writer according to claim 2 and changes any of said unit panels according to a product class of a magnetic tape and to write a predetermined servo signal in the magnetic tape.

12. A write and inspection method of a servo signal that uses a servo writer according to claim 4 and changes any of said unit panels according to a product class of a magnetic tape and to write a predetermined servo signal in the magnetic tape.

* * * * *